United States Patent
Chen et al.

(10) Patent No.: US 12,158,693 B2
(45) Date of Patent: *Dec. 3, 2024

(54) PHOTOGRAPHING DEVICE SUPPORT HAVING AUXILIARY HANDLE

(71) Applicant: SHENZHEN DIEPIN TECHNOLOGY CO., LTD., Guangdong (CN)

(72) Inventors: Weihao Chen, Shenzhen (CN); Hengfei Zhang, Shenzhen (CN)

(73) Assignee: SHENZHEN DIEPIN TECHNOLOGY CO., LTD., Shenzhen (CN)

( * ) Notice: Subject to any disclaimer, the term of this patent is extended or adjusted under 35 U.S.C. 154(b) by 176 days.

This patent is subject to a terminal disclaimer.

(21) Appl. No.: 17/869,119

(22) Filed: Jul. 20, 2022

(65) Prior Publication Data

US 2022/0357640 A1 Nov. 10, 2022

Related U.S. Application Data

(63) Continuation of application No. PCT/CN2021/071493, filed on Jan. 13, 2021.

(30) Foreign Application Priority Data

Jan. 20, 2020 (CN) .......................... 202020127251.7

(51) Int. Cl.
*G03B 17/56* (2021.01)
*F16M 11/08* (2006.01)
(Continued)

(52) U.S. Cl.
CPC ........... *G03B 17/563* (2013.01); *F16M 11/08* (2013.01); *F16M 11/28* (2013.01); *F16M 13/04* (2013.01); *F16M 2200/022* (2013.01)

(58) Field of Classification Search
CPC .... G03B 17/56; G03B 17/561; G03B 17/563; F16M 11/02; F16M 11/04; F16M 11/06;
(Continued)

(56) References Cited

U.S. PATENT DOCUMENTS

| 2017/0192344 A1 | 7/2017 | Chi et al. |
| 2018/0066792 A1 | 3/2018 | Chen |

(Continued)

FOREIGN PATENT DOCUMENTS

| CN | 107461588 A | 12/2017 |
| CN | 109668039 A | 4/2019 |

(Continued)

OTHER PUBLICATIONS

Extended European Search Report issued on Jun. 6, 2023, in corresponding European Application No. 21744286.2, 7 pages.
Office Action issued on Jul. 18, 2023, in corresponding Japanese Application No. 2022-544116, 14 pages.
(Continued)

*Primary Examiner* — Clayton E. LaBalle
*Assistant Examiner* — Fang-Chi Chang
(74) *Attorney, Agent, or Firm* — Maier & Maier, PLLC

(57) ABSTRACT

A photographing device support having an auxiliary handle includes: a telescopic support body, a connecting apparatus, and a clamping apparatus; and an auxiliary handle for an operator to grip, one end of the auxiliary handle is provided with a hinge joint, and the auxiliary handle is up-and-down rotatably connected to the connecting apparatus by the hinge joint, the hinge joint is provided with a first convex platform, and the connecting apparatus is provided with an elastic locking piece, the elastic locking piece cooperates with the first convex platform, so that when the auxiliary handle rotates downwards to fold relative to the telescopic support body, the elastic locking piece is elastically deformed at first to enable the first convex platform to rotate upwards and cross over the elastic locking piece, and then is reset to (Continued)

prevent the first convex platform from rotating back, so as to lock the auxiliary handle.

19 Claims, 5 Drawing Sheets

(51) Int. Cl.
*F16M 11/28* (2006.01)
*F16M 13/04* (2006.01)

(58) Field of Classification Search
CPC ........ F16M 11/08; F16M 11/16; F16M 11/18; F16M 11/20; F16M 11/2007; F16M 11/2014; F16M 11/24; F16M 11/242; F16M 11/26; F16M 11/28; F16M 11/30; F16M 13/04; F16M 2200/02; F16M 2200/021; F16M 2200/022; F16M 2200/08
See application file for complete search history.

(56) References Cited

U.S. PATENT DOCUMENTS

| | | | |
|---|---|---|---|
| 2019/0162214 | A1 | 5/2019 | Chen |
| 2019/0265580 | A1* | 8/2019 | Zhu ........................ F16M 11/10 |

FOREIGN PATENT DOCUMENTS

| | | |
|---|---|---|
| CN | 110324471 A | 10/2019 |
| CN | 209767610 U | 12/2019 |
| CN | 212251923 U | 12/2020 |
| EP | 3591467 A1 | 1/2020 |
| JP | S5488120 A | 7/1979 |
| JP | 2004333722 A | 11/2004 |
| TW | M618398 U | 10/2021 |
| WO | 2010031208 A1 | 3/2010 |

OTHER PUBLICATIONS

International Search Report (with English Translation) and Written Opinion of the International Searching Authority mailed Mar. 26, 2021, in corresponding International Application No. PCT/CN2021/071493, 15 pages.

* cited by examiner

PHOTOGRAPHING DEVICE SUPPORT HAVING AUXILIARY HANDLE

CROSS-REFERENCE TO RELATED APPLICATIONS

The present application is a continuation of International Application No. PCT/CN2021/071493, filed on Jan. 13, 2021, which claims priority to Chinese Patent Application No. 202020127251.7 filed with the China National Intellectual Property Administration on Jan. 20, 2020 and entitled "Photographing Device Support Having Auxiliary Handle". The disclosures of the aforementioned applications are hereby incorporated by reference in their entireties.

TECHNICAL FIELD

The present disclosure relates to the technology field of telescopic support body and, in particular, to a photographing device support having an auxiliary handle.

BACKGROUND

With the increasing demand for photographing with mobile phones, photographing device supports such as selfie sticks have emerged as photographing tools for clamping mobile phones. A support can be arbitrarily telescopic within a certain length, and a user only needs to fix a mobile phone on a telescopic stick. The support allows the user to have a longer photographing distance than an arm when photographing, and the user can easily choose more photographing angles.

The Chinese patent with application number of CN2019101176051 and publication number of CN109668039A discloses a multifunctional selfie stick, including a support, a clamping apparatus, an auxiliary handle, etc. The support is rotatably connected with a connector, the auxiliary handle is hinged to the connector, and the auxiliary handle can be folded to the support. A locking handle component is provided between the connector and the auxiliary handle. The locking handle component includes a pushing block and a third limiting groove disposed on the connector. When the auxiliary handle is folded to the support, the pushing block may be pushed to make a protruding strip of the pushing block enter the third limiting groove, so that the auxiliary handle is kept in a state of being folded to the support. For the locking handle component, the pushing block needs to be manually pushed when the auxiliary handle is kept in the state of being folded to the support, which is not easy to operate.

SUMMARY

In order to overcome the shortcomings of the prior art, the present disclosure provides a photographing device support having an auxiliary handle to solve the aforementioned technical problems.

Specifically, the technical solution is as follows: a photographing device support having an auxiliary handle, where the photographing device support includes a telescopic support body, a connecting apparatus, and a clamping apparatus, the connecting apparatus is coaxially connected to a top portion of the telescopic support body, and is capable of rotating around the telescopic support body, the clamping apparatus is configured to clamp a photographing device, and the clamping apparatus is installed on the connecting apparatus; and the photographing device support further includes an auxiliary handle for an operator to grip, one end of the auxiliary handle is provided with a hinge joint, and the auxiliary handle is up-and-down rotatably connected to the connecting apparatus by the hinge joint, the hinge joint is provided with a first convex platform, and the connecting apparatus is provided with an elastic locking piece, the elastic locking piece cooperates with the first convex platform, so that when the auxiliary handle is locked after the auxiliary handle rotates downwards to fold relative to the telescopic support body, and during a process of the auxiliary handle being folded to the telescopic support body, the elastic locking piece is elastically deformed to enable the first convex platform to rotate upwards and cross over the elastic locking piece, and after the first convex platform crosses over the elastic locking piece, the elastic locking piece is reset to prevent the first convex platform from rotating back, so as to lock the auxiliary handle.

In a specific embodiment, the photographing device support further includes a movable locking block, and the movable locking block is movably disposed in the connecting apparatus.

The hinge joint is further provided with a second convex platform, so that when the auxiliary handle rotates downwards to fold, the second convex platform rotates upward, and pushes the movable locking block to move toward the telescopic support body and to abut against the telescopic support body, so as to prevent the connecting apparatus from rotating around the telescopic support body.

The photographing device support further includes a reset spring, so that when the auxiliary handle rotates upwards to unfold relative to the telescopic support body, the second convex platform rotates downwards and leaves the movable locking block, and the reset spring pushes the movable locking block to be reset and then to release the movable locking block relative to the telescopic support body, so as to enable the connecting apparatus to rotate around the telescopic support body.

In a specific embodiment, the top portion of the telescopic support body is provided with a connecting shaft, so that when the auxiliary handle rotates downwards to fold, the second convex platform rotates upward, and pushes the movable locking block to move toward the telescopic support body and to abut against the connecting shaft, so as to prevent the connecting apparatus from rotating around the telescopic support body.

In a specific embodiment, the connecting apparatus includes a connecting sleeve and a hinge frame extending from a side wall of the connecting sleeve, the connecting sleeve is rotatably sleeved on the connecting shaft, the hinge joint is hinged to the hinge frame, the side wall of the connecting sleeve has a side opening, and the movable locking block is movably inserted in the side opening.

In a specific embodiment, a damping apparatus is disposed between the connecting shaft and the connecting sleeve, and is configured to provide damping when the connecting sleeve rotates relative to the connecting shaft.

In a specific embodiment, contact surfaces between the movable locking block and the connecting shaft are toothed portions, and the movable locking block abuts against the connecting shaft when the toothed portions are engaged.

In a specific embodiment, contact surfaces between the movable locking block and the telescopic support body are toothed portions that are matched with each other, and the movable locking block abuts against the telescopic support body when the toothed portions are engaged.

In a specific embodiment, the hinge joint is a column-shaped hinge joint disposed substantially horizontally, and the first convex platform and the second convex platform are disposed on a column-shaped side surface of the hinge joint.

One end of the movable locking block facing the hinge joint has an arc-shaped groove for the first convex platform and the second convex platform to pass over when the first convex platform and the second convex platform rotate.

In a specific embodiment, the auxiliary handle is rotatably sleeved on the hinge joint, and a rotation axis of the auxiliary handle around the hinge joint is perpendicular to a rotation axis of the hinge joint around the connecting apparatus.

In a specific embodiment, after the auxiliary handle rotates downwards to fold relative to the telescopic support body, the rotation of the auxiliary handle enables the auxiliary handle to be unfolded relative to the telescopic support body, and during a process of rotating the auxiliary handle to enable the auxiliary handle to be unfolded relative to the telescopic support body, the elastic locking piece is elastically deformed to enable the first convex platform to rotate downwards and cross over the elastic locking piece.

In a specific embodiment, an adapter frame is provided between the clamping apparatus and the connecting apparatus, the clamping apparatus is hinged to one end of the adapter frame, and the connecting apparatus is hinged to the other end of the adapter frame.

In a specific embodiment, the auxiliary handle is provided with a remote controller for controlling the photographing device, and the remote controller is detachably disposed on the auxiliary handle by one or more of a buckle, a magnet, and a groove on the auxiliary handle; and/or, the auxiliary handle is provided with a controlling element, and the controlling element is electrically connected to the photographing device by a wire or connected to the photographing device by a wireless communication module.

In a specific embodiment, the telescopic support body has supporting legs for supporting on a ground surface or a table surface, the number of the supporting legs is multiple, a plurality of the supporting legs are hinged to the telescopic support body, the telescopic support body is provided with accommodating grooves adapted to the supporting legs, the supporting legs are integrally accommodated in the accommodating grooves after being rotated to fold, and the plurality of the supporting legs support the telescopic support body after being rotated to unfold; and/or, the telescopic support body includes a telescopic stick having two or more joints.

The present disclosure has at least the following beneficial effects: When the photographing device support needs to be folded to the telescopic support body, the rotation of the auxiliary handle relative to the connecting apparatus enables the auxiliary handle to be folded to the telescopic support body, and during a process of rotating the auxiliary handle, the first convex platform crosses over the elastic locking piece, and the elastic locking piece can prevent the first convex platform from rotating back, so that the auxiliary handle is locked. When the auxiliary handle is folded to the support and is kept in a folding state, only one action of rotating the auxiliary handle is needed for the photographing device support, and the operation is simple. When the photographing device support is needed to use, only one action of rotating the auxiliary handle is needed as well, so that the auxiliary handle is unfolded relative to the telescopic support body.

The photographing device support has multiple functions, which can be used by the user to grip the auxiliary handle to photograph during movement. Compared with the prior art, it is more conducive to ergonomic design, reduces shaking, significantly improves stability during position changing process, especially improves stability of movement when the photographing device needs to be rotated during panoramic photographing, and facilitates improving photographing quality. Moreover, the auxiliary handle being hinged to the connecting apparatus allows the position of the auxiliary handle to be changed, which is convenient for folding and preservation, adapts to various photographing angles or changes the extension angle of the user's hand and arm, prevents the user's hand and arm from tingling or disease, and promotes health and user experience. Moreover, when the auxiliary handle is folded, the auxiliary handle can be locked so as not to be out of the folding state due to the weight thereof. When handheld follow-up photographing, the shaking of the mobile phone are reduced by using a two-axis rotation of the auxiliary handle, and the gripping is comfortable.

Furthermore, the auxiliary handle rotates freely in two axis directions in a use state, which can greatly improve the correction of the back and forth shaking and the left and right shaking of the photographing device such as a mobile phone caused by the walking of human beings during video shooting.

Furthermore, when the auxiliary handle rotates downwards to fold, the elastic locking piece cooperates with the first convex platform to lock the auxiliary handle, the second convex platform and the movable locking block are linked to lock the connecting apparatus, meanwhile also to lock the rotation of the connecting apparatus around the telescopic support body, and the photographing device support can return to the use function of a selfie stick only by one action. That is, the locking of the storage of the auxiliary handle satisfies the flexible switching between video shooting and selfie function.

The telescopic support body has the supporting legs for supporting on the ground surface or the table surface, and can be used for supporting by being placed on a supporting surface such as the ground surface, which improves the shaking of the mobile phone caused by the rotation for panoramic photographing.

In order to make the above-mentioned objects, features and advantages of the present disclosure more obvious and understandable, the following is a detailed description of preferred embodiments in combination with accompanying drawings.

BRIEF DESCRIPTION OF DRAWINGS

In order to describe the technical solutions of the embodiments of the present disclosure more clearly, the following will briefly introduce the drawings needed in the embodiments. It should be understood that the following drawings only illustrate some embodiments of the present disclosure, and thus should not be regarded as limitations on the scope. For those of ordinary skill in the art, other related drawings may also be obtained according to these drawings without creative work.

DETAILED DESCRIPTION OF THE EMBODIMENTS

Figure 1:
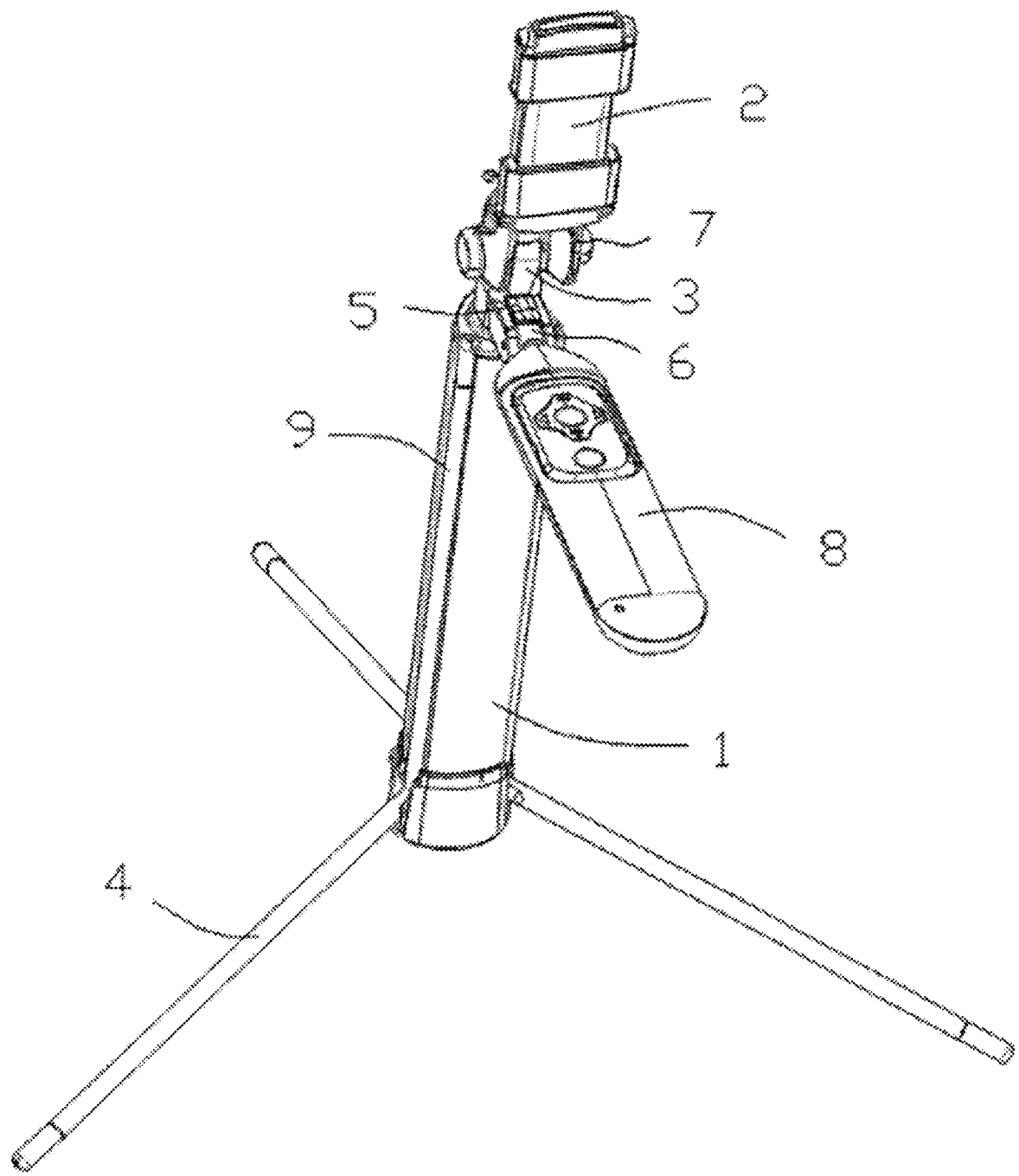
FIG. 1 is a perspective view of an overall structure of a photographing device support having an auxiliary handle in an embodiment.
Figure 2:
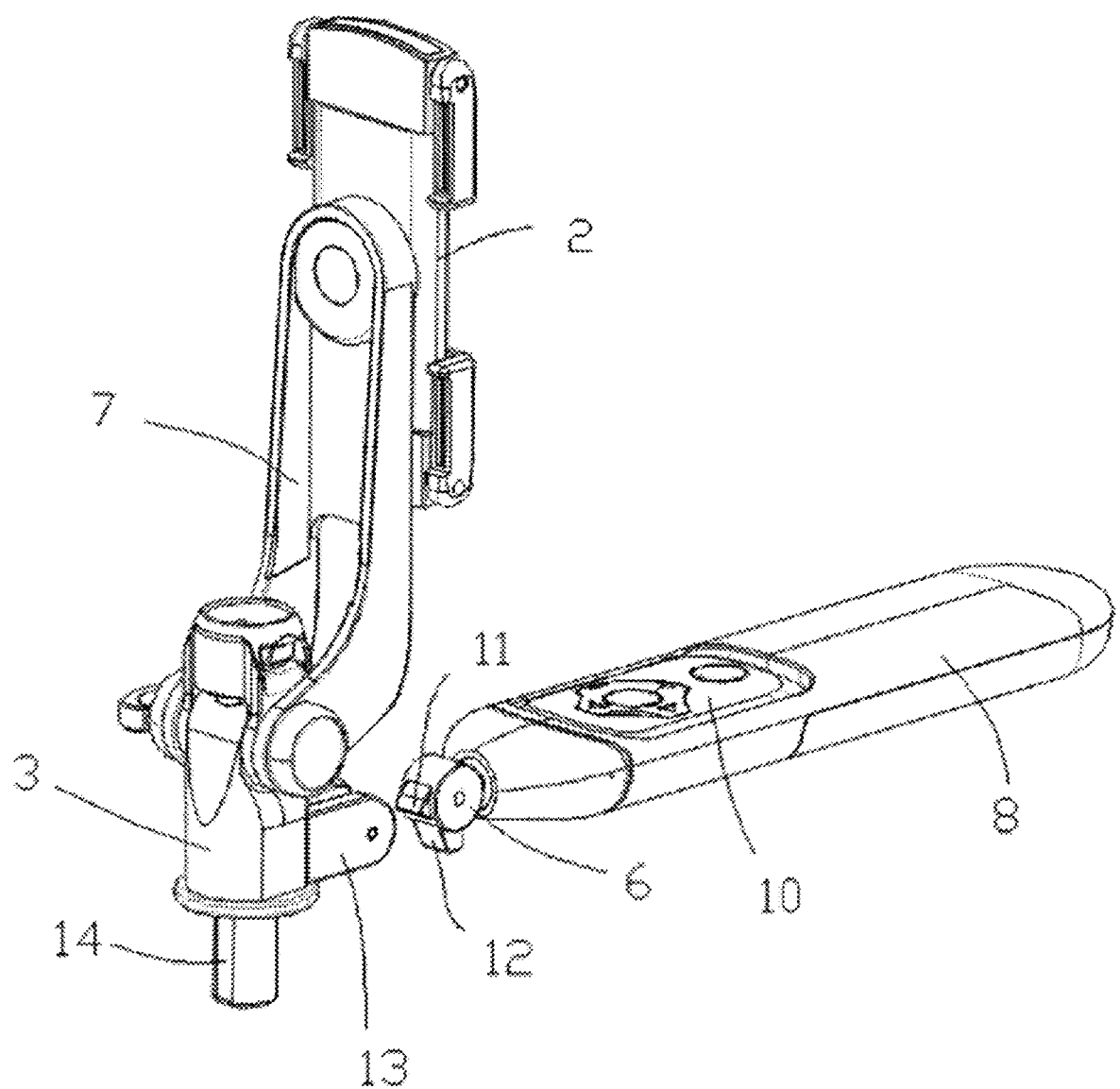
FIG. 2 is a partial exploded view between a clamping apparatus, a connecting apparatus, and the auxiliary handle in the embodiment.
Figure 3:
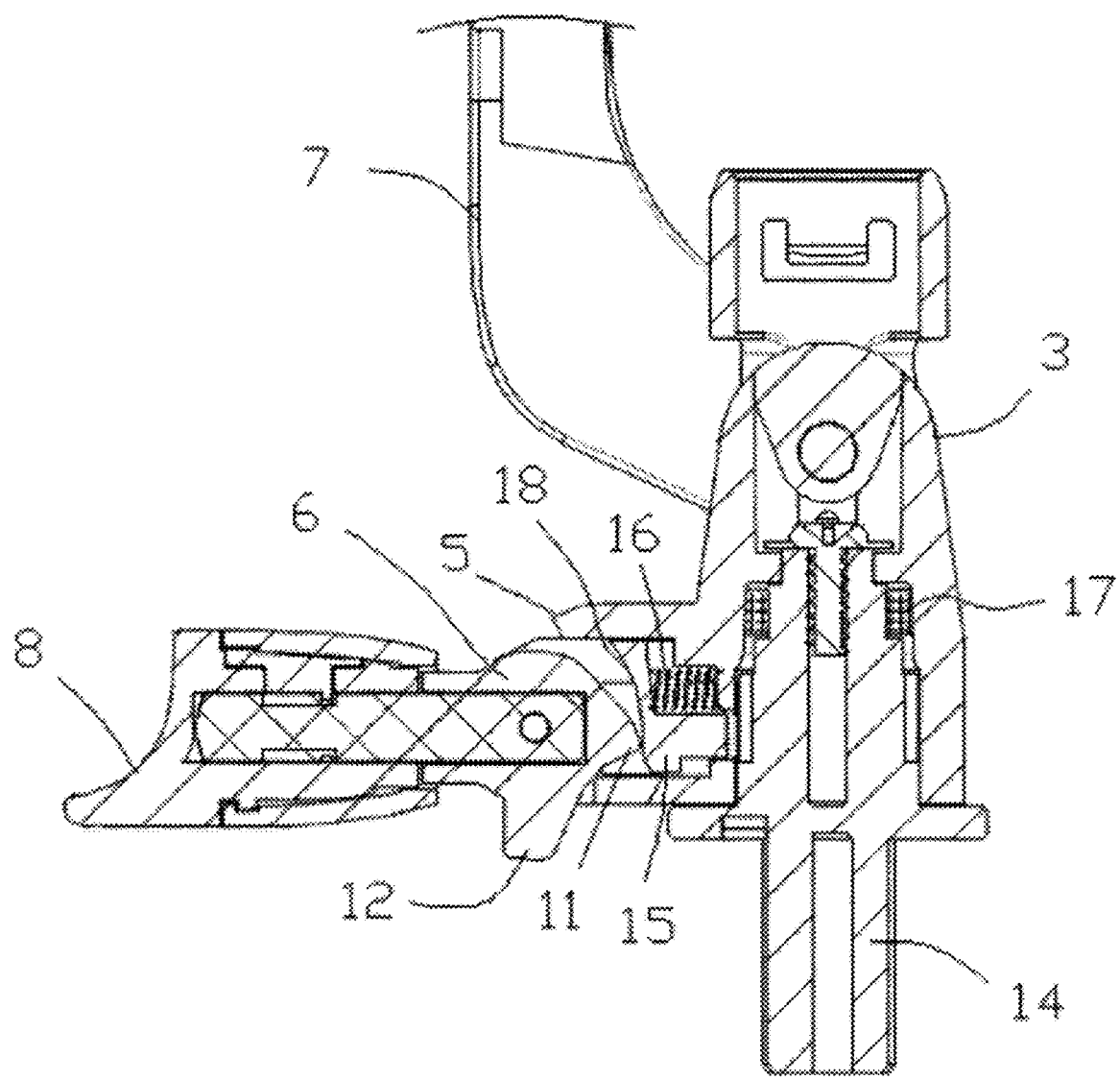
FIG. 3 is a partial cross-sectional view between the connecting apparatus and the auxiliary handle in the embodiment.
Figure 4:
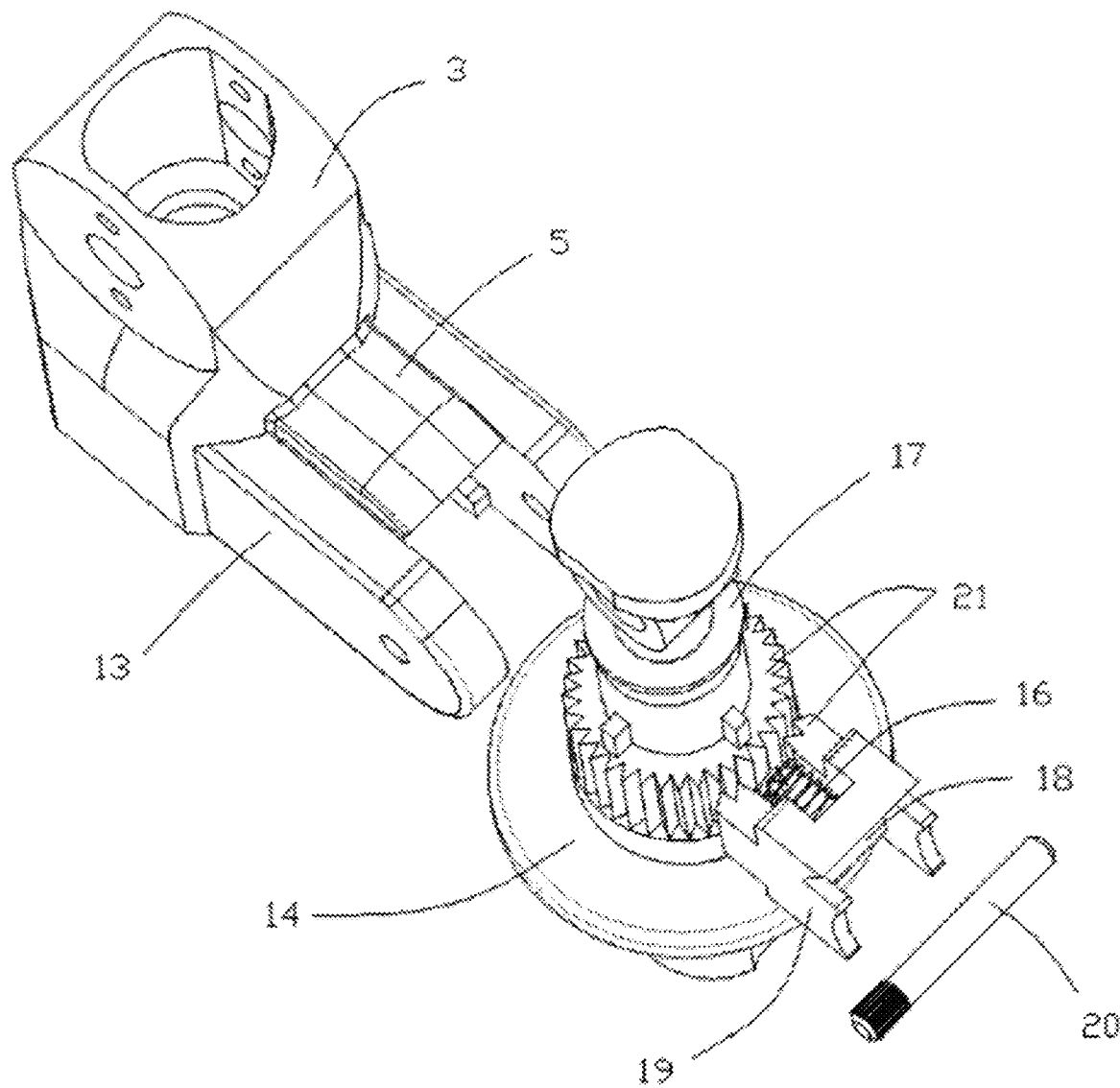
FIG. 4 is a partial exploded view of the connecting apparatus and a connecting shaft in the embodiment.
Figure 5:
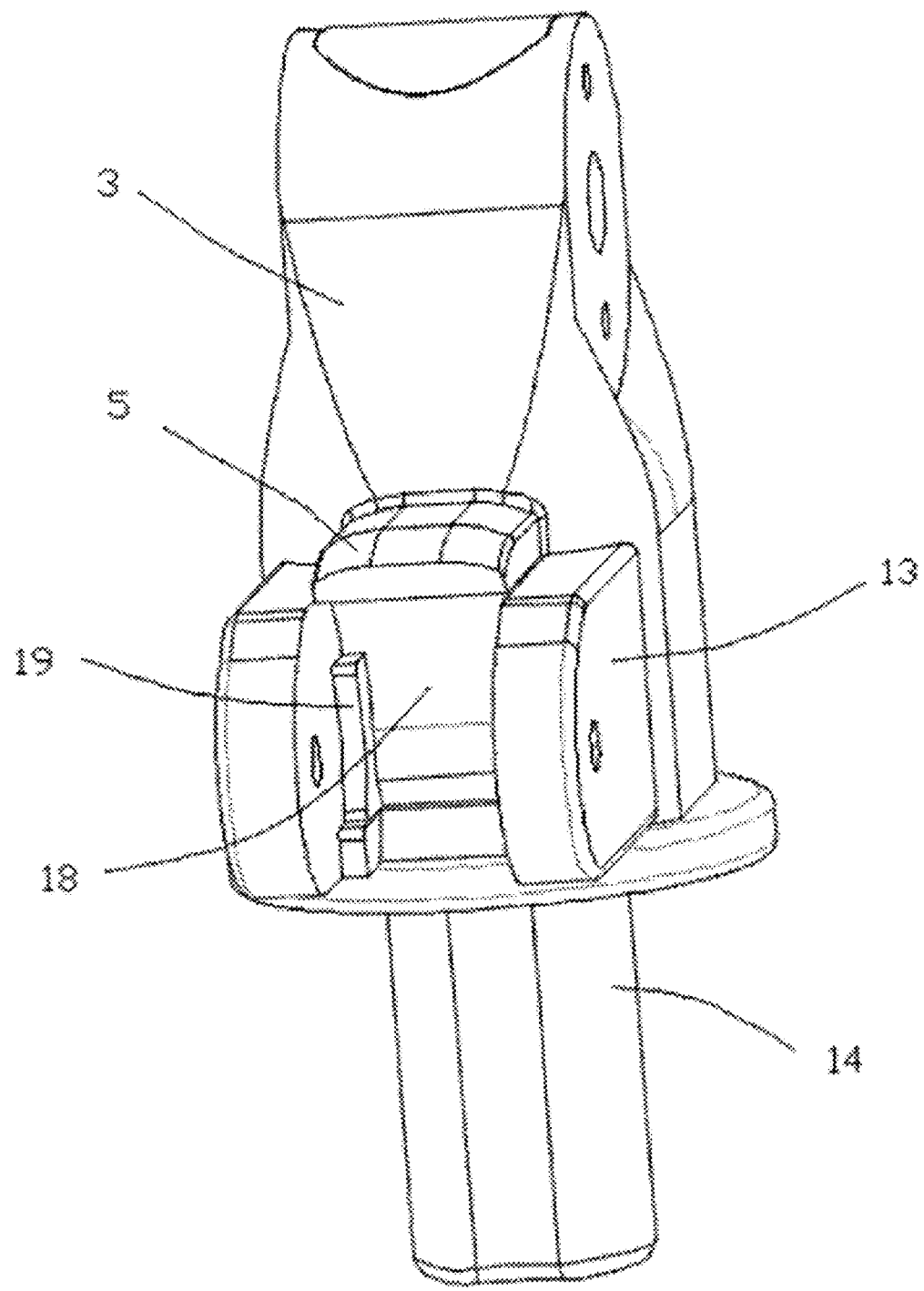
FIG. 5 is a perspective view of an assembled state of the connecting apparatus and the connecting shaft in the embodiment.

As shown in FIG. 1 to FIG. 5, the present embodiment provides a photographing device support having an auxiliary handle, includes: a telescopic support body 1, a connecting apparatus, a clamping apparatus 2, and an auxiliary handle 8 for an operator to grip, where the photographing device includes a mobile phone, a tablet computer, etc.

Where the telescopic support body 1 has supporting legs 4 for supporting on a ground surface or a table surface. Specifically, the telescopic support body 1 is a supporting part of the photographing device support having the auxiliary handle, and is configured to support the whole photographing device support having the auxiliary handle on the ground surface or the table surface. Exemplarily, the telescopic support body 1 includes a cylinder body component, and the telescopic support body 1 further includes a telescopic stick extending from a top portion of the cylinder body component, so that the telescopic support body 1 can extend to an enough height when used, and the telescopic support body 1, after used, contracts its length to become smaller for easy carrying. In the present embodiment, the number of the support legs 4 is multiple, and a plurality of supporting legs 4 are hinged to the telescopic support body 1. FIG. 1 illustrates a situation in which the number of the support legs 4 is three, and a three-leg supporting structure is formed at this time. The telescopic support body 1 is provided with accommodating grooves 9 adapted to the supporting legs 4, the supporting legs 4 are integrally accommodated in the accommodating grooves 9 after being rotated to fold, and the plurality of supporting legs 4 support the telescopic support body 1 after being rotated to unfold, where the telescopic support body 1 includes a telescopic stick having two or more joints.

In the present embodiment, the clamping apparatus 2 is used for clamping the photographing device. Exemplarily, the clamping apparatus 2 includes a first clamping head and a second clamping head that can slide relative to each other, and a clamping gap is formed between the first clamping head and the second clamping head. It should be noted that a specific sliding structure between the first clamping head and the second clamping head may refer to the prior art, for example, a pin is inserted between the two, and a reset spring is sleeved on the pin, which will not be repeatedly described in the present embodiment.

In the present embodiment, the connecting apparatus is coaxially connected to a top portion of the telescopic support body 1, and is capable of rotating around the telescopic support body 1, and the clamping apparatus 2 is installed on the connecting apparatus. Specifically, an adapter frame 7 is provided between the clamping apparatus 2 and the connecting apparatus, the clamping apparatus 2 is hinged to one end of the adapter frame 7, and the connecting apparatus is hinged to the other end of the adapter frame 7. Exemplarily, the end of the adapter frame 7 connected to the connecting apparatus is two connecting pieces, the connecting apparatus is located between the two connecting pieces, the connecting apparatus has a shaft hole, a central shaft is inserted in the shaft hole, and the two connecting pieces are respectively sleeved on the central shaft, thereby realizing a rotatable connection between the adapter frame 7 and the connecting apparatus. Exemplarily, the central shaft is a screw inserted in the shaft hole, correspondingly, the shaft hole has an internal thread that matches the screw. When an user rotates the screw along one direction, the adapter frame 7 and the connecting apparatus can be locked tightly, which prevents a relative rotation between the two. When the user rotates the screw in another direction, the adapter frame 7 and the connecting apparatus can be unlocked, so that the two can rotate relative to each other. Exemplarily, a rotation axis of the adapter frame 7 is perpendicular to a rotation axis of the connecting apparatus, and a rotation axis of the clamping apparatus 2 is perpendicular to the rotation axis of the adapter frame 7. Specifically, the rotation axis of the connecting apparatus is parallel to the cylinder body component. Therefore, the clamping apparatus 2 has multiple freedom degrees of rotation.

In the present embodiment, one end of the auxiliary handle 8 is provided with a hinge joint 6, and the auxiliary handle 8 is up-and-down rotatably connected to the connecting apparatus by the hinge joint 6, the hinge joint 6 is provided with a first convex platform 11, and an elastic locking piece 5 is disposed on the connecting apparatus, the elastic locking piece 5 cooperates with the first convex platform 11, so that when the auxiliary handle 8 rotates downwards to fold relative to the telescopic support body 1, the elastic locking piece 5 is elastically deformed to enable the first convex platform 11 to rotate upwards and cross over the elastic locking piece 5, and after the first convex platform 11 rotates and crosses over the elastic locking piece 5, the elastic locking piece 5 is reset to prevent the first convex platform 11 from rotating back, so as to lock the auxiliary handle 8.

In the present embodiment, the photographing device support having the auxiliary handle further includes a movable locking block 15, and the movable locking block 15 is movably disposed in the connecting apparatus. The hinge joint 6 is further provided with a second convex platform 12, so that when the auxiliary handle 8 rotates downwards to fold, the second convex platform 12 rotates upward, and pushes the movable locking block 15 to move toward the telescopic support body 1 and to abut against the telescopic support body 1, so as to prevent the connecting apparatus from rotating around the telescopic support body 1.

In a specific implementation method, the top portion of the telescopic support body 1 is provided with a connecting shaft 14, the connecting apparatus includes a connecting sleeve 3 and a hinge frame 13 extending from a side wall of the connecting sleeve 3, the connecting sleeve 3 is rotatably sleeved on the connecting shaft 14, the hinge joint 6 is hinged to the hinge frame 13, the side wall of the connecting sleeve 3 has a side opening, and the movable locking block 15 is movably inserted in the side opening. Specifically, the hinge joint 6 and the hinge frame 13 are provided with shaft holes, and a hinge shaft 20 is inserted in the shaft holes of the two to realize the hinging.

In the present embodiment, the photographing device support having the auxiliary handle further includes a reset spring 16, so that when the auxiliary handle 8 rotates upwards to unfold relative to the telescopic support body 1, the second convex platform 12 rotates downwards and leaves the movable locking block 15, and the reset spring 16 pushes the movable locking block 15 to be reset and then to release the movable locking block 15 relative to the telescopic support body 1, so as to enable the connecting apparatus to rotate around the telescopic support body 1. Specifically, one end of the reset spring 16 abuts against the movable locking block 15, and the other end of the reset spring 16 abuts against the connecting apparatus, such as abuts against the connecting sleeve 3.

Preferably, a damping apparatus 17, such as a damping ring, is disposed between the connecting shaft 14 and the connecting sleeve 3, to provide damping when the connecting sleeve 3 rotates relative to the connecting shaft 14.

In the present embodiment, contact surfaces between the movable locking block 15 and the connecting shaft 14 are toothed portions 21, and the movable locking block 15 presses against the telescopic support body 1 when the toothed portions 21 are engaged.

In the present embodiment, the hinge joint 6 is a column-shaped hinge joint 6 disposed substantially horizontally, and the first convex platform 11 and the second convex platform 12 are disposed on a column-shaped side surface of the hinge joint 6. One end of the movable locking block 15 facing the hinge joint 6 has an arc-shaped groove 18 for the first convex platform 11 and the second convex platform 12 to pass over when the first convex platform 11 and the second convex platform 12 rotate. Preferably, both sides of the arc-shaped groove 18 are respectively provided with convex portions 19, and the convex portions 19 have arc-shaped surfaces that match with the hinge joint 6.

In the present embodiment, the auxiliary handle 8 is rotatably sleeved on the hinge joint 6, and a rotation axis of the auxiliary handle 8 around the hinge joint 6 is perpendicular to a rotation axis of the hinge joint 6 around the connecting apparatus.

In the present embodiment, a lamp cap configured to generate a light source is further included, and the lamp cap is detachably disposed on the clamping apparatus 2 or on the connecting apparatus.

In the present embodiment, the auxiliary handle 8 is provided with a remote controller 10 for controlling the photographing device. In a specific implementation method, a groove is on the auxiliary handle 8, and the remote controller 10 is detachably disposed in the groove. Therefore, when the user needs to use the remote controller 10 to operate the photographing device, the remote controller 10 can be easily taken out from the groove, and the remote controller 10 can be placed in the groove when the remote controller 10 is no longer used, which can prevent loss and is convenient to carry.

In other embodiments, the auxiliary handle 8 is provided with a controlling element, and the controlling element is electrically connected to the photographing device by a wire or connected to the photographing device by a wireless communication module, where the controlling element includes a key pad or a touch display screen, the user can operate the photographing device by operating the controlling element, and the wireless communication module includes a Bluetooth unit, an infrared unit, or a radio frequency unit, etc.

Therefore, the photographing device support has multiple functions. In addition to using the telescopic support body 1 to support on the ground surface or the table surface for photographing, the photographing device support can also be used by the user to grip the auxiliary handle 8 to photograph during movement. Compared with the prior art, the photographing device support is more conducive to ergonomic design, reduces shaking, significantly improves stability during position changing process, especially improves movement stability when the photographing device needs to be rotated during panoramic photographing, and facilitates improving photographing quality. Moreover, the auxiliary handle 8 being hinged to the connecting apparatus allows the position of the auxiliary handle 8 to be changed, which is convenient for folding and preservation, adapts to various photographing angles or changes the extension angle of the user's hand and arm, prevents the user's hand and arm from tingling or disease, and promotes health and user experience. Moreover, when the auxiliary handle 8 is folded, the auxiliary handle 8 can be locked so as not to be out of the folding state due to the weight thereof.

Furthermore, the auxiliary handle 8 rotates freely in two axis directions in a use state, which can greatly improve the correction of the back and forth shaking and the left and right shaking of the photographing device such as a mobile phone caused by the walking of human beings during video shooting.

Furthermore, when the auxiliary handle 8 rotates downwards to fold, the elastic locking piece 5 cooperates with the first convex platform 11 to lock the auxiliary handle 8, the second convex platform 12 and the movable locking block 15 are linked to lock the connecting apparatus, meanwhile also to lock the rotation of the connecting apparatus around the telescopic support body 1, and the photographing device support can return to the use function of a selfie stick only by one action.

Furthermore, the rotation axis of the adapter frame 7 is perpendicular to the rotation axis of the connecting apparatus, and the rotation axis of the clamping apparatus 2 is perpendicular to the rotation axis of the adapter frame 7. Preferably, the rotation axis of the adapter frame 7 is in a horizontal direction, the rotation axis of the connecting apparatus is in a vertical direction, and the rotation axis of the clamping apparatus 2 is perpendicular to the rotation axis of the adapter frame 7 and is in the horizontal direction. Therefore, the photographing device has more rotation freedom on the selfie stick, and can change positions very flexibly, so that the selfie stick can be used flexibly in more scenes.

The above disclosures are only several specific implementation scenes of the present disclosure, however, the present disclosure is not limited thereto, and any changes that can be thought of by those skilled in the art should all fall into the protection scope of the present disclosure.

What is claimed is:

1. A photographing device support having an auxiliary handle, the photographing device support comprising: a telescopic support body, a connecting apparatus, and a clamping apparatus, the connecting apparatus is coaxially connected to a top portion of the telescopic support body, and is capable of rotating around the telescopic support body, the clamping apparatus is configured to clamp a photographing device, and the clamping apparatus is installed on the connecting apparatus; and the photographing device support further comprises an auxiliary handle for an operator to grip, one end of the auxiliary handle is provided with a hinge joint, and the auxiliary handle is up-and-down rotatably connected to the connecting apparatus by the hinge joint, the hinge joint is provided with a first convex platform, and the connecting apparatus is provided with an elastic locking piece, the elastic locking piece cooperates with the first convex platform, so that the auxiliary handle is locked after the auxiliary handle rotates downwards to fold relative to the telescopic support body, and during a process of the auxiliary handle being folded to the telescopic support body, the elastic locking piece is elastically deformed to enable the first convex platform to rotate upwards and cross over the elastic locking piece, and after the first convex platform crosses over the elastic locking piece, the elastic locking piece is reset to prevent the first convex platform from rotating back, so as to lock the auxiliary handle;

wherein the photographing device support further comprises a movable locking block, the movable locking block is movably disposed in the connecting apparatus;

the hinge joint is further provided with a second convex platform, so that when the auxiliary handle rotates downwards to fold, the second convex platform rotates upward, and pushes the movable locking block to move toward the telescopic support body and to abut against the telescopic support body, so as to prevent the connecting apparatus from rotating around the telescopic support body; and the photographing device support further comprises a reset spring, so that when the auxiliary handle rotates upwards to unfold relative to the telescopic support body, the second convex platform rotates downwards and leaves the movable locking block, and the reset spring pushes the movable locking block to be reset and then to release the movable locking block relative to the telescopic support body, so as to enable the connecting apparatus to rotate around the telescopic support body.

2. The photographing device support having the auxiliary handle according to claim 1, wherein the top portion of the telescopic support body is provided with a connecting shaft, and when the auxiliary handle rotates downwards to fold, the second convex platform rotates upward, and pushes the movable locking block to move toward the telescopic support body and to abut against the connecting shaft, so as to prevent the connecting apparatus from rotating around the telescopic support body.

3. The photographing device support having the auxiliary handle according to claim 2, wherein the connecting apparatus comprises a connecting sleeve and a hinge frame extending from a side wall of the connecting sleeve, the connecting sleeve is rotatably sleeved on the connecting shaft, the hinge joint is hinged to the hinge frame, the side wall of the connecting sleeve has a side opening, and the movable locking block is movably inserted in the side opening.

4. The photographing device support having the auxiliary handle according to claim 3, wherein a damping apparatus is disposed between the connecting shaft and the connecting sleeve, and is configured to provide damping when the connecting sleeve rotates relative to the connecting shaft.

5. The photographing device support having the auxiliary handle according to claim 4, wherein the telescopic support body has supporting legs for supporting on a ground surface or a table surface, the number of the supporting legs is multiple, a plurality of the supporting legs are hinged to the telescopic support body, the telescopic support body is provided with accommodating grooves adapted to the supporting legs, the supporting legs are integrally accommodated in the accommodating grooves after being rotated to fold, and the plurality of the supporting legs support the telescopic support body after being rotated to unfold; the telescopic support body comprises a telescopic stick having two or more joints.

6. The photographing device support having the auxiliary handle according to claim 3, wherein the telescopic support body has supporting legs for supporting on a ground surface or a table surface, the number of the supporting legs is multiple, a plurality of the supporting legs are hinged to the telescopic support body, the telescopic support body is provided with accommodating grooves adapted to the supporting legs, the supporting legs are integrally accommodated in the accommodating grooves after being rotated to fold, and the plurality of the supporting legs support the telescopic support body after being rotated to unfold; the telescopic support body comprises a telescopic stick having two or more joints.

7. The photographing device support having the auxiliary handle according to claim 2, wherein contact surfaces between the movable locking block and the connecting shaft are toothed portions that are matched with each other, and the movable locking block abuts against the connecting shaft when the toothed portions are engaged.

8. The photographing device support having the auxiliary handle according to claim 7, wherein the telescopic support body has supporting legs for supporting on a ground surface or a table surface, the number of the supporting legs is multiple, a plurality of the supporting legs are hinged to the telescopic support body, the telescopic support body is provided with accommodating grooves adapted to the supporting legs, the supporting legs are integrally accommodated in the accommodating grooves after being rotated to fold, and the plurality of the supporting legs support the telescopic support body after being rotated to unfold; the telescopic support body comprises a telescopic stick having two or more joints.

9. The photographing device support having the auxiliary handle according to claim 2, wherein the telescopic support body has supporting legs for supporting on a ground surface or a table surface, the number of the supporting legs is multiple, a plurality of the supporting legs are hinged to the telescopic support body, the telescopic support body is provided with accommodating grooves adapted to the supporting legs, the supporting legs are integrally accommodated in the accommodating grooves after being rotated to fold, and the plurality of the supporting legs support the telescopic support body after being rotated to unfold; the telescopic support body comprises a telescopic stick having two or more joints.

10. The photographing device support having the auxiliary handle according to claim 1, wherein contact surfaces between the movable locking block and the telescopic support body are toothed portions that are matched with each other, and the movable locking block abuts against the telescopic support body when the toothed portions are engaged.

11. The photographing device support having the auxiliary handle according to claim 10, wherein the telescopic support body has supporting legs for supporting on a ground surface or a table surface, the number of the supporting legs is multiple, a plurality of the supporting legs are hinged to the telescopic support body, the telescopic support body is provided with accommodating grooves adapted to the supporting legs, the supporting legs are integrally accommodated in the accommodating grooves after being rotated to fold, and the plurality of the supporting legs support the telescopic support body after being rotated to unfold; the telescopic support body comprises a telescopic stick having two or more joints.

12. The photographing device support having the auxiliary handle according to claim 1, wherein the hinge joint is a column-shaped hinge joint disposed substantially horizontally, and the first convex platform and the second convex platform are disposed on a column-shaped side surface of the hinge joint; and one end of the movable locking block facing the hinge joint has an arc-shaped groove for the first convex platform and the second convex platform to pass over when the first convex platform and the second convex platform rotate.

13. The photographing device support having the auxiliary handle according to claim 12, wherein the telescopic support body has supporting legs for supporting on a ground surface or a table surface, the number of the supporting legs is multiple, a plurality of the supporting legs are hinged to the telescopic support body, the telescopic support body is provided with accommodating grooves adapted to the supporting legs, the supporting legs are integrally accommodated in the accommodating grooves after being rotated to fold, and the plurality of the supporting legs support the telescopic support body after being rotated to unfold; the telescopic support body comprises a telescopic stick having two or more joints.

14. The photographing device support having the auxiliary handle according to claim 1, wherein the auxiliary handle is rotatably sleeved on the hinge joint, and a rotation axis of the auxiliary handle around the hinge joint is perpendicular to a rotation axis of the hinge joint around the connecting apparatus.

15. The photographing device support having the auxiliary handle according to claim 14, wherein the telescopic support body has supporting legs for supporting on a ground surface or a table surface, the number of the supporting legs is multiple, a plurality of the supporting legs are hinged to the telescopic support body, the telescopic support body is provided with accommodating grooves adapted to the supporting legs, the supporting legs are integrally accommodated in the accommodating grooves after being rotated to fold, and the plurality of the supporting legs support the telescopic support body after being rotated to unfold; the telescopic support body comprises a telescopic stick having two or more joints.

16. The photographing device support having the auxiliary handle according to claim 1, wherein after the auxiliary handle rotates downwards to fold relative to the telescopic support body, the rotation of the auxiliary handle enables the auxiliary handle to be unfolded relative to the telescopic support body, and during a process of rotating the auxiliary handle to enable the auxiliary handle to be unfolded relative to the telescopic support body, the elastic locking piece is elastically deformed to enable the first convex platform to rotate downwards and cross over the elastic locking piece.

17. The photographing device support having the auxiliary handle according to claim 16, wherein the telescopic support body has supporting legs for supporting on a ground surface or a table surface, the number of the supporting legs is multiple, a plurality of the supporting legs are hinged to the telescopic support body, the telescopic support body is provided with accommodating grooves adapted to the supporting legs, the supporting legs are integrally accommodated in the accommodating grooves after being rotated to fold, and the plurality of the supporting legs support the telescopic support body after being rotated to unfold; the telescopic support body comprises a telescopic stick having two or more joints.

18. The photographing device support having the auxiliary handle according to claim 1, wherein the telescopic support body has supporting legs for supporting on a ground surface or a table surface, the number of the supporting legs is multiple, a plurality of the supporting legs are hinged to the telescopic support body, the telescopic support body is provided with accommodating grooves adapted to the supporting legs, the supporting legs are integrally accommodated in the accommodating grooves after being rotated to fold, and the plurality of the supporting legs support the telescopic support body after being rotated to unfold; the telescopic support body comprises a telescopic stick having two or more joints.

19. The photographing device support having the auxiliary handle according to claim 1, wherein the telescopic support body has supporting legs for supporting on a ground surface or a table surface, the number of the supporting legs is multiple, a plurality of the supporting legs are hinged to the telescopic support body, the telescopic support body is provided with accommodating grooves adapted to the supporting legs, the supporting legs are integrally accommodated in the accommodating grooves after being rotated to fold, and the plurality of the supporting legs support the telescopic support body after being rotated to unfold; the telescopic support body comprises a telescopic stick having two or more joints.

* * * * *